Sept. 19, 1950 R. V. LINDNER ET AL 2,522,881
CLUTCH FOR DISKS OF REMOTE-CONTROL SYSTEMS
Filed Jan. 23, 1947 2 Sheets-Sheet 1
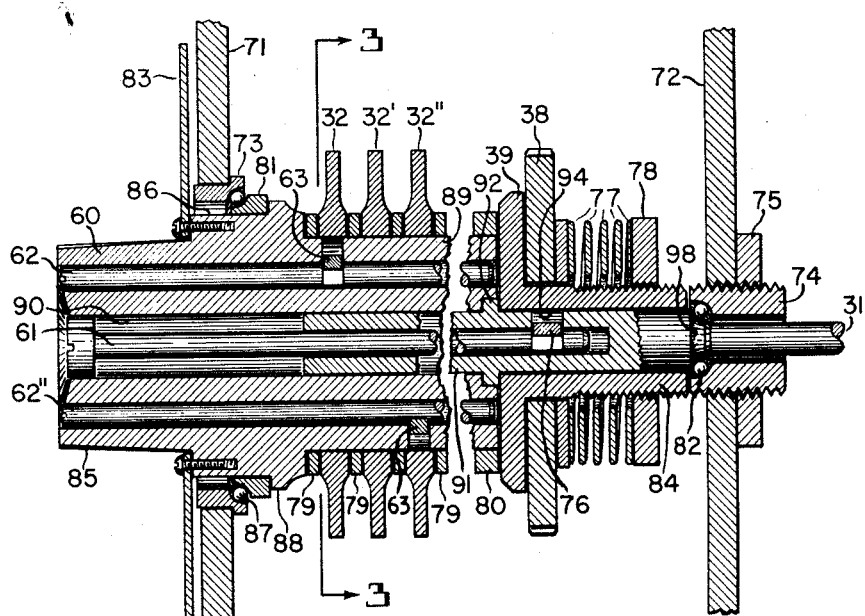
Fig. 2
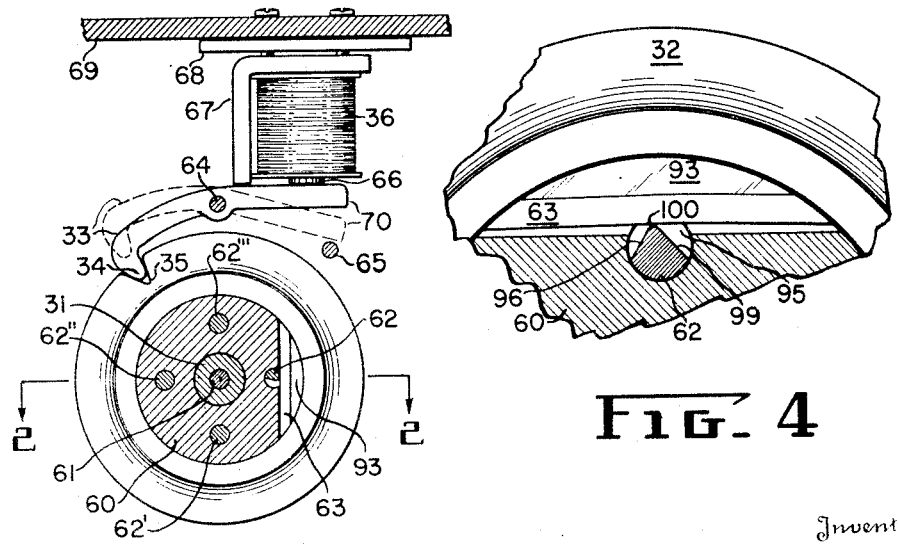
Fig. 3
Fig. 4
Inventor
RALPH V. LINDNER
ROBERT B. EDWARDS
By Robert T. Killman
Attorney Patented Sept. 19, 1950

2,522,881

UNITED STATES PATENT OFFICE 2,522,881

CLUTCH FOR DISKS OF REMOTE-CONTROL SYSTEMS

Ralph V. Lindner and Robert B. Edwards, Baltimore, Md., assignors to Bendix Aviation Corporation, Towson, Md., a corporation of Delaware Application January 23, 1947, Serial No. 723,752

8 Claims. (Cl. 192—12)

1

This invention relates to remote control systems, and more particularly to systems designed to control the angular positioning of a shaft, or a plurality of shafts, to a plurality of selectable, predetermined positions.

The invention is particularly applicable to systems of this type which are utilized to simultaneously and remotely tune various components of communication equipment to operation on a selected one of a plurality of frequency channels.

Systems proposing to provide such control have in the past required considerable time to complete the cycle of channel selection. In some installations, such as aircraft communication equipment, the readiness with which desired channels are at the command of an operator is of considerable importance.

While some systems provide for a variety of selectable angular positions for a shaft control means with respect to like other shaft control means and all driven by a single positioning drive motor, they do not provide positive maintenance of the shafts in the positions selected. The result is that vibration and shock can change a critically positioned shaft so as to effectively reduce the efficiency of operation of such devices as high frequency radio tuned circuits.

Some such systems also provide for adjustment whereby the operating position of each channel, in a plurality of selectable channels, may be established at any point of shaft rotation, but such adjustment is mechanically clumsy so as to require partial disassembly and special tools. When the accuracy of angular positioning is as critical as in a high frequency tuning system, then ease of adjustment during operation is highly desirable.

An object of this invention is to provide a system for actuating a shaft to any of a plurality of predetermined angular positions, within a minimum of time.

Another object of this invention is to provide a system for establishing a shaft at any of a plurality of predetermined angular positions with positive accuracy and rigidity.

A further object of this invention is to provide a system for positioning a shaft at predetermined angular stations such that the angular adjustment means for establishing the predetermined stations at desired angular positions is readily accessible while the associated equipment is in operation, and such that adjustment may be accomplished with a minimum of tools and time.

Other objects and advantages will become apparent from a consideration of the following

2 specification when taken in conjunction with the accompanying drawing, in which

Fig. 2 is a cross-sectional view of the shaft positioning drum assembly of the system of Fig. 1 taken along its longitudinal axis and along line 2—2 of Fig. 3;

Fig. 3 is a cross-sectional view of the shaft positioning drum assembly taken along the line 3—3 of Fig. 2; and Fig. 4 is an enlargement of the clamping shoe and its actuating cam.

Figure 1:
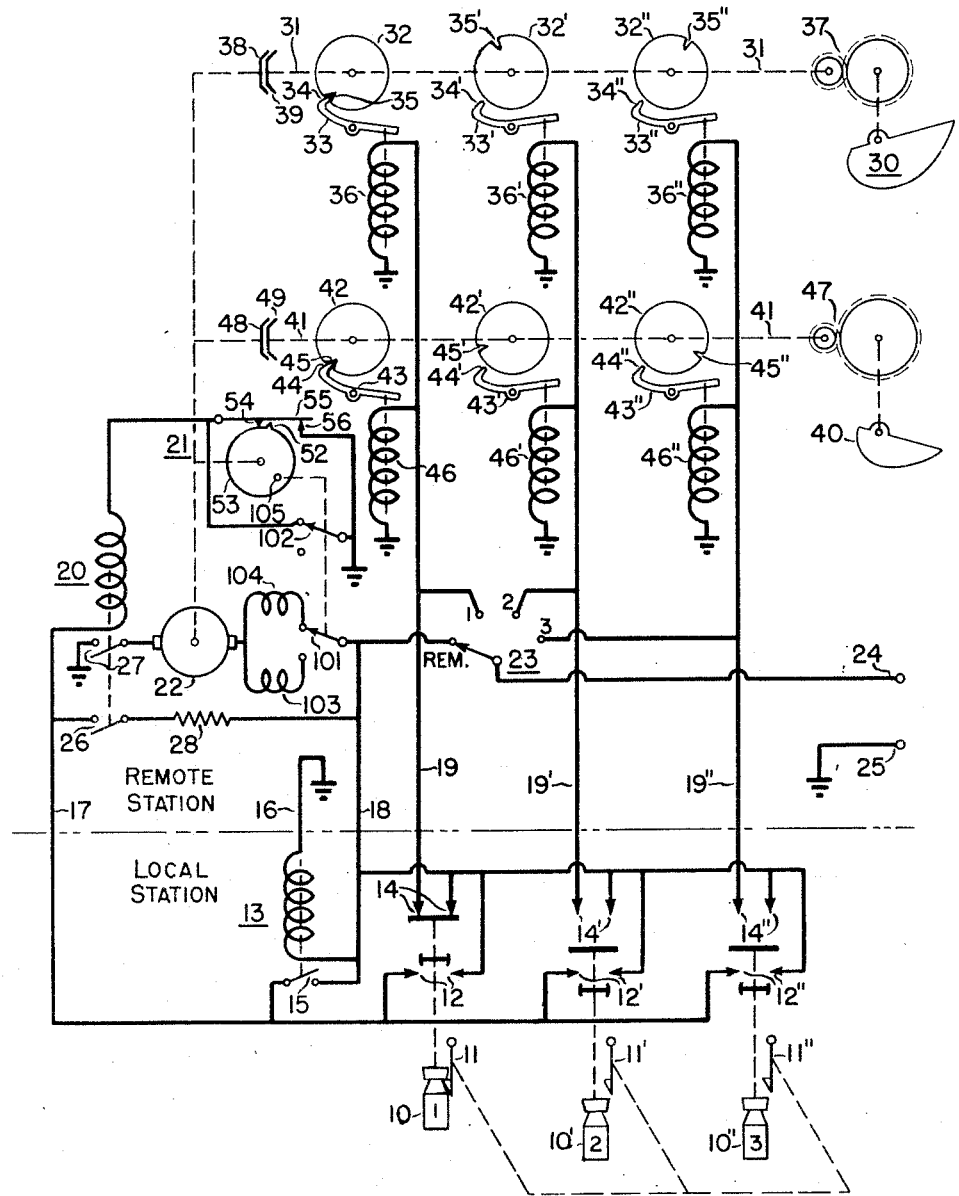
Fig. 1 is a schematic diagram of a control system embodying the invention.

Referring more particularly to Fig. 1, one embodiment of this invention is illustrated by the diagram in which push-buttons 10, 10', 10'', and any feasible number of identical buttons, each actuate contact switches 12, 14 or 12', 14', etc. Leads 16, 17, 18, together with 19, 19' 19'', etc. provide electrical control of a remotely located system for positioning devices 30, 40 and appropriate similar devices, at pre-chosen angular positions. (It is to be observed that the primed and double-primed numbers refer to items identical to those identified by corresponding unprimed numbers.)

In the remote unit, a relay 20 together with a breaker cam 21 controls the operation of a motor 22. Said motor drives shafts 31, 41, which in turn rotate the devices 30, 40, respectively. The devices 30, 40 are illustrated as plates of a condenser, the plate 30 being driven by shaft 31 through a two to one reduction gear train 37 and the plate 40 through a four to one reduction gear train 47. By this arrangement indicator dials carried by the shafts 31, 41 may be rotated through 360° for a condenser rotor variation of 180° in the case of shaft 31 and of 90° in the case of the shaft 41. Other devices and corresponding shafts may be driven by the same motor, and since all shaft positioning systems incorporated in this specification are identical, only the items associated with shaft 31 will be described. Items 40 to 49 are identical to respective items 30 to 39.

According to the number of shaft positions used, a corresponding number of notched discs 32, 32', etc., are assembled on shaft 31 and each adjusted to any desired angular position with respect to the shaft. Adjacent to the circumferential edge of each disc is a lever 33 so positioned, and of such design, that when the lever is actuated by the coil 36 a tooth 34 penetrates a notch 35 which extends inwardly from the circumference of said disc. Otherwise, the tooth 34 is, by the form and positioning of the lever, caused to lightly contact the circumference of the disc. The clutch plates 38 and 39 interact to cause the shaft 31 to be driven by motor 22 so long as shaft 31 is free to turn.

A multiple throw switch 23 provides a means at the "remote" station to control the energy source to the push-button contact switches and the drive motor, and to control any of the selectable sets of channel relays. A set of channel relays comprises one relay in conjunction with each shaft to be positioned and all relay coils 36, 46, etc., in a set are electrically parallel. The source voltage fed by conductors 24 and 25 is consistent with the design of the drive motor and the relay coils. One conductor 25 is grounded as is one side of each coil and one side of the drive motor through control contacts 27. In the "remote" position switch 23 permits any of the predetermined positions of each shaft to be selected at the "local" station control means.

One cycle of channel selection will now be described. Let us suppose that channel 1 is in operation with button 10 depressed as indicated. Upon choosing to operate in the channel 2 position, we depress button 10'. Button 10' acts upon catch 11' and in turn upon catch 11 to release button 10 whose spring tension disengages contacts 14 and de-energizes all coils, 36, etc., in channel 1. Levers 33, etc., will be released and all discs 32, etc., together with their respective shafts will thereupon be free to rotate. Contacts 12' will be momentarily closed and relay 20 will be energized whereupon relay contacts 26 and 27 will close. Contacts 26 will provide relay 20 with energy limited by resistor 28 but ample to maintain the relay in its energized state. Contacts 27 will complete the circuit through motor 22 which will now drive breaker cam 21 and all shafts together with their firmly fixed positioning discs.

Having pressed button 10' for channel 2 till it is maintained by catch 11', contacts 14' will be closed and coil 36' will be energized, whereupon lever 33' will be acted upon to press tooth 34' against the circumferential edge of disc 22'. (It is to be remembered that the components of disc 42' and associated relay act as do the disc 32' components.) When shaft 31 has been rotated till notch 35' coincides with the tooth 34' of lever 33', said tooth will be seated in the notch to provide the fixed position for shaft 31. At the same time the drive motor 22 continues to turn the breaker cam 21, clutch plate 38, and all other shafts which have not yet reached their respective notch-to-tooth engagements. The friction contact of plates 38 and 39 permits the shaft with plate 39 to remain fixed while the motor continues to drive plate 38.

When the breaker cam 21 has been driven one complete revolution the drive plate 38 of the friction clutch will have been driven for at least one complete revolution. However, the condenser rotors 30 and 40 are provided with stops which limit their movement to their respective intended sectors. The movement of the shafts 31, 41 is likewise limited. Thus, if one of the condenser rotors 30, 40, etc., had been previously set near the limit of its movement, it will be stopped by its limit stop shortly after the beginning of motor rotation. Unless the condenser position for the new channel setting falls within the small sector covered, correct channel setting will not be achieved by one revolution of the clutch plate 38. It is, therefore, necessary to also rotate the clutch plate 38 through a second complete rotation but in the reverse direction. A single revolution of clutch plate 38 will suffice where shafts 31, 41 etc. drive a condenser or other mechanism through a direct drive.

For this purpose the motor 22 is provided with two field coils 103 and 104. When coil 103 is energized the motor will rotate in a counterclockwise direction. Energization of coil 104 produces clockwise motor rotation. A single-pole, double-throw switch 101 is provided by which either of the coils may be energized. A second single-pole, double-throw switch 102 is provided, which is ganged with switch 101, and which provides a ground connection for relay 20 when coil 104 is energized. A second ground connection, in parallel with that formed by switch 102 is provided through a contact 56 and a contact lever 55 which is biased to normal contact therewith.

The breaker cam 21 is provided with a tooth 52 shaped like an inverted V, which at one point in the rotation of the cam will coact with a similar tooth 54 on the lever 55 to force it out of contact with contact 56. The cam 21 is also provided with a switch operator 105 located substantially oppositely of the tooth 52 and positioned to operate just after the openings of the contacts 55, 56. The switches 101, 102 may be of the toggle type.

With the switches 101, 102 in position as shown, the motor and the breaker cam will turn for one revolution in a clockwise direction. As the revolution is begun the contacts 55, 56 will be opened but this will not stop the motor due to the ground through switch 102. The breaker cam is shown in the position it occupies just after the contacts 55, 56 have been opened and have closed. The operator 105 will at the completion of the revolution actuate the switches 101, 102 to their left-hand positions which will cause coil 103 to be energized and the ground previously provided for relay 20 through switch 102 to be opened. The motor and cam will then reverse their rotation. Upon completion of one counterclockwise rotation, the tooth 52 will encounter the tooth 54 and will break contact between the contacts 55, 56 before the operator 105 reverses the switches 101, 102. Since the ground circuit of relay 20 is now opened the motor will stop, but the action of part 52 with part 54 will be of sufficiently short duration that contacts 55, 56 will again close before motor 22 and disc 53 have ceased turning. Once relay 20 is de-energized, the contacts 26 and the contacts 27 will open to break the drive motor circuit. When the drive motor is at rest the cycle of channel selection is complete.

To change the angular position of a disc 32 with respect to its shaft 31 and thus reset the operating station of the positioned device 30 in consequence of such channel selection, switch 23 is turned to the channel 1 position. The control mean at the "local station" will be de-energized so that any other channel control will be released and the contacts 15 of relay 13 will close. The drive motor will likewise be inoperative. All the relay coils 36, etc., for the channel 1 will be energized and react with lever 33 to press tooth 34 against the rim of disc 32. Shaft 31 is now turned by hand till notch 35 is aligned with and receives tooth 34. Disc 32 is now in operating position.

By means to be described in this specification disc 32 is loosened from shaft 31 so that the shaft can be freely turned, and by observation of the positioned device 30, which is firmly fixed to the shaft, the correct operating position is readily achieved. When such operating position is accurately determined the disc 32 is firmly clamped to the shaft 31. After the adjustment for device 30, and such other associated devices, is thus completed switch 23 is again returned to the "remote" position, whereupon relay 20 is energized through contacts 15 before they are opened by the similarly energized relay 13. With contacts 26 maintaining relay 20 energized, the drive motor, now energized, will drive all shafts till the channel relays in control at the start of the adjustment will again resume control as the cycle of channel selection is readily completed as previously described.

While the "local station" is designed with the possibility of comprising a separate unit removed somewhat from the "remote station" unit and joined thereto by a multiple conductor cable, it may, however, be installed as an integral part of the "remote station" should no separation be desired.

Fig. 2 illustrates one mechanical arrangement by means of which a group of discs, such as 32, and 32'' of Fig. 1, may be associated with a shaft 31 and the clutch 38, 39 in accordance with the invention, in a manner to afford the ease of adjustment of the angular positioning stations of the shaft which is one of the objects of the invention. The view is taken along the axis of the shaft 31 and shows that shaft as comprising a uniform cylindrical section 91 extending with a driving fit into one end of a bore 90 formed axially of a hub 60.

The penetration of the shaft 31 into the hub is limited by a collar portion 92 formed thereon. Beyond the collar portion the shaft again reduces in diameter to provide a portion 97 of uniform diameter. This portion of the shaft is terminated in a concavely tapered section, the concave surface 98 of which acts as a ball race for a series of balls 82. The opposite race is formed by a concave annular surface formed in a bearing sleeve 74 which is threaded into an opening formed in a chassis plate 72. This arrangement allows the sleeve 74 to act as an axially adjustable thrust bearing for the shaft 31.

The hub 60 is formed outwardly into cylindrical surfaces of various diameter. The end of the hub remote from the shaft 31, and which will be designated the front end, extends through an opening in a chassis mounting plate 71 and terminates in a portion 60 having a knurled surface 85, and which is of a diameter rendering it convenient for grasping by the hand. Adjoining the hub portion 60 is a portion 86 of larger diameter. Secured against the annular shoulder formed at the junction of these portions is a dial 83 which may be calibrated in a manner to indicate the angular position of the hub with respect to a reference mark on the chassis. A stop, not shown, is provided to prevent more than 360° of dial rotation in either direction, when the shaft 31 drives a driven mechanism through gearing. Otherwise it is not needed.

The hub portion 85 is terminated by a collar portion 88 of still larger diameter. Secured on hub portion 86 by a force fit and abutted against the collar 88 is a bearing ring 81 having an annular concave surface which acts as a ball race for a series of bearing balls 87. The opposing ball race is constituted by an annular concave surface formed on a ring 73 secured in the opening of the chassis plate 71 through which the hub extends.

Behind the collar 88 the diameter of the hub is abruptly reduced to form a cylindrical portion 89 of uniform diameter which extends to the end of the hub. The discs 32, 32', 32'', and any like discs desired, are mounted on the cylindrical portion 89 of hub 60, which is proportioned in accordance with the number of discs utilized. Separating rings 79 provide the spacing of the discs necessary to accommodate the levers 33, 33' etc. and the relay coils 36, 36', etc. which actuate them. The series of discs and separating rings are held snugly against the shoulder 79 by retaining ring 39.

The mechanical arrangement of the disc 32, the lever 33 and the relay coil 36 is shown in Fig. 3, in which the disc is shown in profile. It will be recalled from the description of Fig. 1 that the function of lever 33 is to coact with disc 32 to arrest its rotation and hold it at the angular position determined by the penetration of tooth 34 of the lever into notch 35 of the disc. The lever 33 is pivotally mounted upon a shaft 64 secured to a chassis plate and is bent at the pivot joint by a small amount and so proportioned that it normally rotates about its pivot point until the tooth lightly contacts the periphery of the disc. The relay coil 36 is mounted upon a permeable metal core 66 which is joined to a frame 67, which, with the core, forms a U-shaped path for magnetic flux. The frame 67, together with the core 66 and coil 36, are separated from a chassis mounting plate 69, upon which they are all mounted, by an insulator 68. Upon energization of coil 36 the end 70 of the lever is attracted toward the magnet, forcing tooth 34 against the periphery of disc 32 and into the notch 35 when the notch and the tooth come into radial coincidence with respect to the axis of the shaft 31.

The dimensioning and locations of the disc, the lever and the relay are such that when the relay is energized and the tooth is positioned in the notch of the disc the air gap between the end 70 of the lever and the core 66 is very small. The end of the tooth 34 is semi-circular and the notch 35 is straight-sided and V-shaped with its outer corners rounded. The trailing edge of the notch is steeper than the leading edge with respect to the radius of the disc. By use of these configurations of notch and tooth, the tooth may lie against the periphery of the disc when the relay is not energized and, upon encountering and entering the notch, will be forced out easily by its trailing edge and will not stop the rotation of the shaft. However, upon energization of the relay the tooth will positively stop the disc and will center itself in the notch for accurate positioning of the disc. Due to the small air-gap left between the end of the lever and the core 66 no chattering of the disc can occur even when wear of the tooth and notch takes place.

In order that the angular positions of the disc 32, 32' etc. may be readily adjusted from the front of the unit, means are provided by which each disc may be individually released and secured to the hub 60 from the front end thereof. This means, which is most comprehensively shown in Figure 2, comprises a separate clutch for each disc. A peripheral flat bottomed slot is formed in the hub 60 directly beneath each of the discs. The cross-sectional profile of such a slot is shown in Figure 2 beneath the disc 32 and beneath the disc 32''. The slot beneath the disc 32 is also shown in Figures 3 and 4 in which it is indicated by the numeral 93. Seated in the bottom of the slot 93 is an elongated shoe 63 of substantially square cross section, the ends of which are formed to match the peripheral configuration of the hub at this portion of the slot. The shoe is thus capable of action as a clutch member which, upon being pressed radially outward of the hub 60, will engage the periphery of the disc 32 and lock the same with respect to the hub. Intersecting the center of the base of each of the slots is a bore which extends longitudinally of the hub and parallel to the axis of the shaft 31. Each of the bores terminates at the front end of the hub. Inserted in each of the bores and snugly fitting therein is a rod. The rod 62 intersecting the slot 93 beneath the disc 32 is shown in Figures 2, 3 and 4.

The portion of the rod which is in coincidence with the slot 93 is slotted as best shown in Figures 3 and 4, the slot being so formed that by rotation of the rod 62 the disc 32 may either be locked to the hub 60 or released therefrom for rotation relative thereto. The slot 95 reduces the rod 62 to a cross sectional configuration such as shown in Fig. 4 by which the shoe 63 may be supported upon either of two flat surfaces 96 and 99. When supported on the surface 96 the shoe 63 is forced into clamping relation to the disc 32, the ends of the shoe bearing against the inner periphery of the disc. Upon counterclockwise rotation of the rod 62 the rounded junction 100 between surfaces 96 and 99 is brought beneath the shoe, whereupon the pressure against the shoe is gradually released as rotation of the rod proceeds. When finally the rotation of the rod brings the surface 98 beneath the shoe, the latter is completely released and the disc 32 is freed for rotation with respect to the hub 60. The end of the rod 62 which projects from the front end of the hub is provided with a slot by means of which the rod may be rotated by the use of a screw driver or similar tool.

As noted in Fig. 3 the rods 62, 62' etc. are spaced uniformly about the shaft 31. While only four rods are shown, many more can be accommodated if required by the number of discs in use, by proper choice of the diameter of the hub. It has been found that as many as 8 rods can be accommodated in a hub of reasonable size.

The slipping clutch arrangement between the motor 22 and the shaft 31 is shown in Fig. 2. A sleeve 84 is fitted over the portion 97 of the shaft 31 and may extend into abutting relationship with the collar 92. The end of the sleeve abutting the collar 92 is provided with flange 39 which forms one of the clutch plates. A portion of the outer periphery of the sleeve 84 is screw threaded and has screwed upon it a plate 78. A clutch plate 38 is mounted for free rotation upon the sleeve 84 and is located in contacting relation with the plate 39. Between the plate 78 and the plate 38 is located a spiral spring 77 which resiliently urges the plate 38 into clutching relation with the plate 39. The periphery of the plate 38 is provided with gear teeth through which it is driven from the motor 22. The tension of the spring 77 may be adjusted by rotation of the plate 78 with respect to the sleeve 84.

Means are provided by which the shaft 31 may be released for free rotation with respect to the clutch assembly just described. This means comprises a clutch arrangement similar to those described above, adjustable from the front end of the hub 60. An axial bore is formed in the shaft 31 which penetrates beneath the sleeve 84. Snugly fitted within this bore is a rod 61 which terminates in an enlarged head occupying the front end of the bore 90 and provided with a slot for the reception of a tool. A radial and peripheral slot 94 is formed in the shaft 31 beneath the sleeve 84 and located in the slot is a shoe 76 which is similar to the shoe 63 described above. A portion of the rod 61 is provided with a cammed slot which acts in the same way as the cammed slot 93 to secure or release the shaft 31 from the sleeve 84.

By the arrangement of clutches described above it is apparent that the setting of any channel can be quickly and easily altered from the control panel of the unit by the use of a screw driver or other similar tool. This feature is of particular importance in aircraft installations where access to the interior of the unit may be extremely difficult and where during flight the time available for the change of channel settings is usually limited.

While the invention is adaptable to the positioning of shafts in a large variety of mechanisms and to related uses, it is particularly advantageous for use as a channel selection means in communications units such, for example, as that disclosed in application Serial No. 673,265 for Oscillation Generator filed by the present applicants on May 31, 1946.

While the disclosure of the invention has been limited to the embodiment thereof which is now preferred, many alterations of form and arrangement, falling within the scope of the invention as defined by the appended claims, will occur to those skilled in the art. The invention is therefore not to be considered as limited to the embodiment disclosed.

What is claimed is:

1. In a mechanism for selectively positioning a shaft at any one of a plurality of predetermined angular positions, the combination comprising a hub surrounding one end of said shaft and secured thereto for rotation therewith, a plurality of discs mounted on said hub, said hub being formed with a peripheral slot beneath each of said discs, a clutch shoe in each of said slots, a plurality of rods each extending into said hub from one end thereof and each penetrating a respective one of said slots, and an angularly non-uniform cam portion formed on each of said rods in coacting relation with the clutch shoe occupying the slot which it penetrates, whereby said shoe may be forced into clutching coaction in accordance with the angular orientation of said rod.

2. In a mechanism for selectively positioning a shaft at any one of a plurality of predetermined angular positions, the combination comprising a hub surrounding one end of said shaft and rotatable therewith, a plurality of discs mounted on said hub, a plurality of rods each extending into said hub from the free end thereof, each being slotted to form therein an angularly non-uniform cam portion in proximity to a respective one of said discs, and clutch means positioned between each of said cam positions and the disc in proximity thereto and coacting therewith, whereby a clutching action is established between each of said rods and a respective one of said discs, said clutching action being a function of the angular orientation of said rod.

3. In the combination as set forth in claim 2, a sleeve surrounding a portion of said shaft, a rod extending from the free end of said hub into said shaft, said rod being coaxial with said hub and said shaft, an angularly non-uniform cam portion formed on the last named rod and clutch means positioned between the last named cam portion and said sleeve and coacting therewith to establish a clutching action between said shaft and said sleeve which is a function of the angular orientation of the last named rod.

4. In a mechanism for selectively positioning a shaft at any one of a plurality of predetermined angular positions, the combination comprising a hub surrounding one end of said shaft and rotatable therewith, a plurality of discs mounted on said hub, said hub being formed with a peripheral slot beneath each of said discs, a clutch shoe in each of said slots, a plurality of rods, each extending into said hub from the free end thereof, parallel to but offset from the axis of said shaft, each of said rods penetrating a respective one of said slots, and an angularly non-uniform cam portion formed on each of said rods in coacting relation with the clutch shoe occupying the slot which it penetrates, whereby the clutching relation of said shoe with the hub and the disc with which it coacts is a function of the angular orientation of said rod.

5. In the combination as set forth in claim 4, a sleeve surrounding a portion of said shaft, a rod extending from the free end of said hub into said shaft, said shaft being formed with a peripheral slot beneath said sleeve, a clutch shoe in said slot, an angularly non-uniform cam portion formed on said rod in coacting relation with said clutch shoe, whereby the clutching relation of said shoe with said hub and said sleeve is a function of the angular orientation of said rod.

6. Means for selectively establishing and maintaining the relative angular positions of a plurality of discs mounted on an axially rotatable cylindrical member, said means comprising a plurality of clutch shoes each coacting with a respective one of said discs, each of said shoes being positioned within a respective peripheral slot formed in said member beneath the one of said discs with which it coacts, a plurality of rods each positioned within a respective bore formed in said member and extending longitudinally thereof, each of said bores intersecting a respective one of said slots, each of said rods having a slot formed therein coextensive with the slot in said member which it intersects and of a size to receive the clutch shoe located therein, the base of said slot formed in said rod being cammed and coacting with said clutch shoe to force it into clutching relation with its respective disc or to release it from said relation upon angular movement of said rod.

7. Means for selectively establishing and maintaining the relative angular positions of a plurality of discs mounted on an axially rotatable cylindrical member, said means comprising a plurality of clutch shoes each coacting with a respective one of said discs, each of said shoes being positioned within a respective peripheral slot formed in said member beneath the one of said discs with which it coacts, a plurality of rods each positioned within a respective bore formed in said member and extending longitudinally thereof, each of said bores intersecting a respective one of said slots, each of said rods being reduced in the portion thereof which communicates with the one of said slots with which it intersects, said reduction providing an angularly non-symmetrical cam surface which coacts with the one of said clutch shoes positioned in said slot, whereby said shoe may be forced into clutching relation with its respective disc or released therefrom by angular movement of said rod.

8. Means for selectably positioning a rotatably driven cylindrical member, comprising a sleeve surrounding a portion of said member and coupling it to a source of driving energy, said member being formed with an axial bore and a peripheral slot intersecting said bore, a clutch shoe positioned in said slot and coacting with said sleeve, a rod positioned in said bore and having formed therein a cammed slot coextensive with the slot in said member and dimensioned to receive said clutch shoe, whereby said sleeve and said member may be clutched together or released upon angular movement of said rod with respect to said member, a plurality of discs mounted upon said member, each of said discs having a stop means formed on its periphery, means coacting with the stop means of any selected one of said discs to arrest angular movement thereof when said stop means reaches a fixed radial position, said member being formed with a plurality of longitudinal bores and peripheral slots, each of said slots being positioned beneath a respective one of said discs and being intersected by a respective one of said bores, a clutch shoe in each of said slots coacting with the disc above it and a rod positioned in each of said bores, each of the last named rods being formed with a cammed slot coextensive with the slot in said member which it intersects and dimensioned to receive the clutch shoe contained therein, whereby the disc positioned at said slot will be clutched to or released from said member upon angular rotation of said rod.

RALPH V. LINDNER.
ROBERT B. EDWARDS.

REFERENCES CITED

The following references are of record in the file of this patent:

UNITED STATES PATENTS

| Number | Name | Date |
|---|---|---|
| Re. 22,574 | Collins | Dec. 5, 1944 |
| 856,971 | MacDonald | June 11, 1907 |
| 1,660,156 | Fuller | Feb. 21, 1928 |
| 1,777,796 | Hubbell | Oct. 7, 1930 |
| 1,974,207 | Ellinger | Sept. 18, 1934 |
| 2,067,992 | Thomas | Jan. 19, 1937 |
| 2,100,936 | Bonn, Jr. | Nov. 30, 1937 |
| 2,231,156 | Claytor | Feb. 11, 1941 |
| 2,299,082 | Elliott | Oct. 20, 1942 |
| 2,320,867 | Hill | June 1, 1943 |
| 2,334,724 | Paessler | Nov. 23, 1943 |
| 2,365,088 | Lane | Dec. 12, 1944 |
| 2,366,912 | Lauper | Jan. 9, 1945 |
| 2,398,849 | Novy | Apr. 23, 1946 |
| 2,413,211 | Brian | Dec. 24, 1946 |